United States Patent
Mills et al.

(10) Patent No.: US 7,818,355 B2
(45) Date of Patent: Oct. 19, 2010

(54) SYSTEM AND METHOD FOR MANAGING CONTENT

(76) Inventors: Brendon W. Mills, 3501 Purdue Ave., Dallas, TX (US) 75225; Clifford L. Hall, III, 10405 Pariva Trail, Austin, TX (US) 78726; Gregory J. Jackson, 4100 Avenue G, Austin, TX (US) 78751; Cuong T. Nguyen, 3004 Persimmon Valley Trail, Austin, TX (US) 78732

( * ) Notice: Subject to any disclaimer, the term of this patent is extended or adjusted under 35 U.S.C. 154(b) by 361 days.

(21) Appl. No.: 11/936,548

(22) Filed: Nov. 7, 2007

(65) Prior Publication Data

US 2009/0119322 A1    May 7, 2009

(51) Int. Cl.
*G06F 17/00* (2006.01)
(52) U.S. Cl. .................. 707/912; 707/913; 707/916
(58) Field of Classification Search ........... 707/912, 707/913, 916
See application file for complete search history.

(56) References Cited

U.S. PATENT DOCUMENTS

| | | | |
|---|---|---|---|
| 4,509,073 A | 4/1985 | Baran et al. | 358/86 |
| 5,093,718 A | 3/1992 | Hoarty et al. | 358/84 |
| 5,319,455 A | 6/1994 | Hoarty et al. | 348/7 |
| 5,361,091 A | 11/1994 | Hoarty et al. | 348/7 |
| 5,412,720 A | 5/1995 | Hoarty | 380/15 |
| 5,442,700 A | 8/1995 | Snell et al. | 380/15 |
| 5,485,197 A | 1/1996 | Hoarty | 348/7 |
| 5,526,034 A | 6/1996 | Hoarty et al. | 348/7 |
| 5,550,578 A | 8/1996 | Hoarty et al. | 348/7 |
| 5,557,316 A | 9/1996 | Hoarty et al. | 348/7 |
| 5,587,734 A | 12/1996 | Lauder et al. | 348/10 |
| 5,594,507 A | 1/1997 | Hoarty | 348/584 |
| 5,812,665 A | 9/1998 | Hoarty et al. | 380/10 |
| 5,883,661 A | 3/1999 | Hoarty | 348/7 |
| 5,953,506 A | 9/1999 | Kalra et al. | 395/200.61 |
| 6,034,678 A | 3/2000 | Hoarty et al. | 345/327 |
| 6,055,315 A | 4/2000 | Doyle et al. | 380/242 |
| 6,064,377 A | 5/2000 | Hoarty et al. | 345/327 |
| 6,100,883 A | 8/2000 | Hoarty | 345/327 |
| 6,205,582 B1 | 3/2001 | Hoarty | 725/93 |
| 6,253,238 B1 | 6/2001 | Lauder et al. | 709/217 |

(Continued)

OTHER PUBLICATIONS

Official Action in U.S. Appl. No. 11/549,226, dated Aug. 3, 2009, 36 pages.

(Continued)

*Primary Examiner*—Sana Al-Hashemi
(74) *Attorney, Agent, or Firm*—Baker Botts L.L.P.

(57) ABSTRACT

A system for managing media files having different format characteristics includes a transcoder, a content store, and a plurality of clients. The content store is capable of storing a media file in a first format. The clients are each associated with one or more media file formats and capable of playing media files to users. The transcoder is capable of receiving a request identifying a media file from a first client and, in response to receiving the request, retrieving the media file from the content store in a first format. The transcoder is also operable of modifying the media file from the first format to a second format associated with the first client and, while modifying the media file from the first format to the second format, transmitting a modified portion of the media file to the first client.

23 Claims, 3 Drawing Sheets

U.S. PATENT DOCUMENTS

| | | | |
|---|---|---|---|
| 6,305,020 B1 | 10/2001 | Hoarty et al. | 725/95 |
| 6,345,279 B1 | 2/2002 | Li et al. | 707/104 |
| 6,407,680 B1 | 6/2002 | Lai et al. | 341/50 |
| 6,421,733 B1 | 7/2002 | Tso et al. | 709/246 |
| 6,593,860 B2 | 7/2003 | Lai et al. | 341/50 |
| 6,888,477 B2 | 5/2005 | Lai et al. | 341/50 |
| 6,970,602 B1 | 11/2005 | Smith et al. | 382/232 |
| 7,093,277 B2 | 8/2006 | Perlman | 725/142 |
| 2001/0056460 A1 | 12/2001 | Sahota et al. | 709/201 |
| 2002/0006204 A1 | 1/2002 | England et al. | 380/269 |
| 2002/0120586 A1 | 8/2002 | Masaki et al. | 705/75 |
| 2002/0194227 A1 | 12/2002 | Day et al. | 707/523 |
| 2003/0004880 A1 | 1/2003 | Banerjee et al. | 705/51 |
| 2003/0158969 A1 | 8/2003 | Gimson et al. | 709/246 |
| 2003/0196206 A1 | 10/2003 | Shusman | 725/91 |
| 2004/0003117 A1 | 1/2004 | McCoy et al. | 709/246 |
| 2004/0111476 A1 | 6/2004 | Trossen et al. | 709/206 |
| 2004/0139233 A1 | 7/2004 | Kellerman et al. | 709/246 |
| 2004/0193648 A1 | 9/2004 | Lai et al. | 707/104.1 |
| 2005/0132264 A1 | 6/2005 | Joshi et al. | 715/500.1 |
| 2005/0172127 A1 | 8/2005 | Hartung et al. | 713/167 |
| 2005/0265395 A1 | 12/2005 | Kim et al. | 370/485 |
| 2005/0286497 A1 | 12/2005 | Zutaut et al. | 370/352 |
| 2006/0015649 A1 | 1/2006 | Zutaut et al. | 709/246 |
| 2006/0026302 A1 | 2/2006 | Bennett et al. | 709/246 |
| 2006/0117379 A1 | 6/2006 | Bennett et al. | 726/3 |
| 2006/0168323 A1 | 7/2006 | Kim et al. | 709/238 |
| 2006/0179472 A1 | 8/2006 | Chang et al. | 726/2 |
| 2006/0265657 A1 | 11/2006 | Gilley | 715/730 |
| 2007/0124816 A1 | 5/2007 | Abigail | 726/24 |
| 2008/0231480 A1* | 9/2008 | Lai et al. | 341/51 |

OTHER PUBLICATIONS

U.S. Appl. No. 05/220,420, filed Sep. 10, 1991, Hoarty et al.

Jun Xin, Chia-Wen, Lin, and Ming-Ting Sun, "Digital Video Transcoding," *Proceedings of the IEEE*, vol. 93, No. 1, pp. 84-97, Jan. 2005.

"Akimbo adds RSS feeds to video-on-demand service," *Online Reporter*, No. 455, 2 pages, Aug. 6, 2005.

Alan Bezoza and Brian Coyne, "How the Internet Will Disrupt the Long-Term Video value Chain," *Friedman, Billings, Ramsey & Co., Inc.*, 27 pages., Oct. 6, 2005.

U.S. Appl. No. 11/328,587, filed Jan. 10, 2006, entitled "System and Method for Routing Content," 59 pages.

U.S. Appl. No. 11/549,226, filed Oct. 13, 2006, entitled "System and Method for Processing Content," 54 pages.

* cited by examiner

SYSTEM AND METHOD FOR MANAGING CONTENT

TECHNICAL FIELD

This invention relates, in general, to media-content delivery systems and, more particularly, to a system and method for managing and modifying media content.

BACKGROUND OF THE INVENTION

The variety and availability of audio, video, and multimedia content has increased significantly in the recent past. Internet, mobile Internet, cell phones, personal data assistants, and other mobile media devices fuel constant development and increased demand for media content delivery in a variety of formats. Furthermore, the rapid growth in user-generated content has created a large supply of media content available to users in a large number of disparate formats.

Converting content from a source format provided by a content source to a different target format supported by a particular media player can be time-consuming and computationally-intense. Moreover, the wide variety of source and target formats available can result in slow content-delivery, create congestion in content-processing components, and require ever increasing storage capabilities. Delays in content processing may degrade user experience.

SUMMARY OF EXAMPLE EMBODIMENTS

In accordance with the present invention, the disadvantages and problems associated with content delivery systems have been substantially reduced or eliminated. In particular, a content-delivery system is disclosed that provides low-latency delivery of content to remote clients.

In accordance with one embodiment of the present invention, a system for managing media files having different format characteristics includes a transcoder, a content store, and a plurality of clients. The content store is capable of storing a media file in a first format. The clients are each associated with a format and capable of playing media files to users. The transcoder is capable of receiving a request identifying a media file from a first client and, in response to receiving the request, retrieving the media file from the content store in a first format. The transcoder is also operable of modifying the media file from the first format to a second format associated with the first client and, while modifying the media file from the first format to the second format, transmitting a modified portion of the media file to the first client.

In accordance with another embodiment of the present invention, a method for managing media files having different format characteristics includes receiving a request from a remote client identifying a media file and, in response to receiving the request, retrieving the media file in a first format. The method also includes modifying the media file from the first format to a second format associated with the remote client and, while modifying the media file from the first format to the second format, transmitting a modified portion of the media file to the remote client.

Technical advantages of certain embodiments of the present invention include the ability to provide media content to devices in differing formats. Additionally, particular embodiments of the present invention may significantly increase content available to media players while decreasing the time necessary to deliver the content. Particular embodiments of the present invention may increase efficient use of transcoding resources, as well as provide low-latency transcoding, transrating, and/or other modifications of media content. Additionally, particular embodiments of the present invention may reduce system complexity by centralizing content processing. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
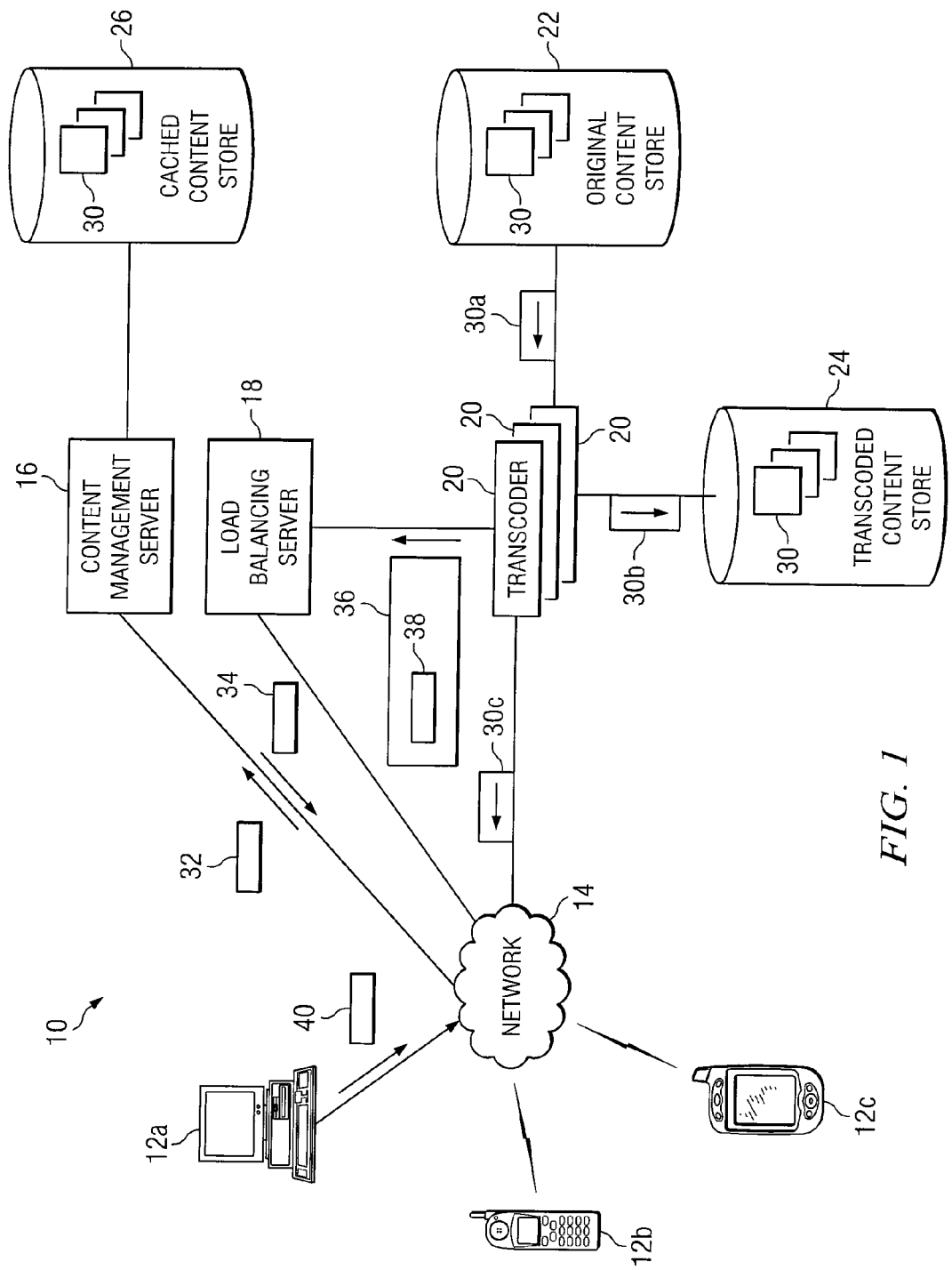
FIG. 1 illustrates a system for managing media content delivery and storage in accordance with one embodiment of the present invention.

FIG. 1 illustrates a particular embodiment of a system 10 for managing and delivering content from media files 30 stored in original content store 22 to clients 12. System 10 includes clients 12a-c, network 14, content management server (CMS) 16, load balancing server 18, one or more transcoders 20, original content store 22, transcoded content store 24, and cached content store 26. To provide content to clients 12 having a variety of different reception and display requirements, system 10 may modify content delivered from original content store 22 to make the content suitable for transmission to and/or display by a particular client 12. By initiating the delivery of modified content from a particular media file 30 to a requesting client 12 before the entire media file 30 has been modified, system 10 may reduce the latency associated with processing content for delivery to a diverse range of clients 12.

In general, within system 10, clients 12 communicate with CMS 16 through network 14 for purposes of requesting content. CMS 16 connects to cached content store 26 and manages access to cached content store 26. Additionally, CMS 16 is coupled to load balancing server 18, which receives and fulfills transcode requests 34 sent by CMS 16. Load balancing server 18 is coupled to one or more transcoders 20 and manages the operation of the associated transcoders 20. Transcoders 20 are capable of retrieving media files 30 from original content store 22 and modifying the retrieved media files 30 so that content from media files 30 can be transmitted to and displayed by a particular client 12. Transcoders 20 are additionally coupled to transcoded content store 24 and store all or parts of modified media files 30 therein. Thus, as a result of the operation of these components, system 10 may, in particular embodiments, be capable of supporting on-demand content provision in a variety of formats for a wide range of different clients.

More specifically, clients 12 display, play, or otherwise communicate content retrieved from cached content store 26, original content store 22, and/or transcoded content store 24 to users. Clients 12 may represent any type of devices appropriate to play one or more type of media content utilized in system 10. Examples of clients 12 may include, but are not limited to, computers, video-enabled telephones, media players (such as audio- and/or video-capable iPods), televisions, and portable communication devices. In general, however, clients 12 may include any appropriate combination of hardware, software, and/or encoded logic suitable to provide the described functionality. Clients 12 may couple to network 14 through a dedicated connection (wired or wireless) or may connect to network 14 only as needed to access media content. For example, clients 12, such as portable media players, may connect temporarily to network 14 to download media files 30 but then disconnect before displaying content from the media files 30. Although FIG. 1 illustrates, for purposes of example, a particular number and type of clients 12, alternative embodiments of system 10 may include any appropriate number and suitable type of clients 12.

In particular embodiments, various clients 12 may only be capable of receiving and/or playing media associated with particular file formats, file types, codecs, bit-rates, and/or resolutions, and/or having other appropriate characteristics. For example, in the illustrated embodiment, client 12a may comprise a computer which utilizes a different media file format than a video-enabled cellphone, represented as client 12b, or a portable communication device, represented as client 12c. Consequently, as described further below, system 10 may modify requested content to match the capabilities of the specific requesting client 12.

Network 14 represents any form of communication network supporting circuit-switched, packet-based, and/or any other suitable type of communication. Although shown in FIG. 1 as a single element, communication network may represent one or more separate networks, including all or parts of various different networks that are separated and serve different groups of clients 12. Network 14 may include routers, hubs, switches, gateways, call controllers, and/or any other suitable components in any suitable form or arrangement. In general, network 14 may comprise any combination of public or private communication equipment such as elements of the public-switched telephone network (PSTN), a global computer network such as the internet, a local area network (LAN), a wide-area network (WAN), or other appropriate communication equipment.

Additionally, although FIG. 1 indicates a particular configuration of elements directly connected to and/or interacting with network 14, network 14 may connect directly or indirectly and/or interact with any appropriate elements of system 10. For example, although FIG. 1 shows transcoders 20 directly connected to original content store 22, transcoders 20 may, in particular embodiments, connect to original content store 22 over network 14. Thus, the components of system 10 may be arranged and configured in any appropriate manner to communicate over network 14 and/or over direct connections between the relevant components.

CMS 16 processes requests from clients 12 to download, retrieve, stream, or view media files 30. In particular embodiments, CMS 16 may also be responsible for initiating transcoding and/or managing the operation of transcoder 20 in delivering content to clients 12. Additionally, CMS 16 may allow clients 12 to browse, search, and/or preview media files 30 available from system 10. For example, in particular embodiments, CMS 16 may host a web page that displays content available on system and allows a user of a particular client 12 to specify or describe a media file 30 requested by the user. Thus, in such embodiments, clients 12 may access the web page and request a download of selected media files 30. CMS 16 may then initiate appropriate operations to deliver the media file 30 to client 12.

CMS 16 may additionally authenticate users, execute content search requests, and/or otherwise facilitate interaction between users and the content-provision services offered by system 10. Although shown in FIG. 1 as a single component, in particular embodiments, content management server 16 may represent functionality provided by several separate physical components. More generally, CMS 16 may represent any appropriate combination of software and/or hardware suitable to provide the described functionality.

In particular embodiments, CMS 16 may be operated by a different entity than transcoders 20 and/or other appropriate portions of system 10. As one example, in particular embodiments, CMS 16 may be operated by a wireless telecommunications provider that outsources transcoding responsibilities to the operator of transcoders 20. As another example, in particular embodiments, CMS 16 may be operated by the operator of a peer-to-peer content-sharing website, such as YouTube, or a social networking website, such as MySpace. Alternatively, in particular embodiments, all the components of system 10 may be operated by a single entity. More generally, however, the components of system 10 may be controlled or operated by any appropriate combination of entities Cached content store 26 stores media files 30 for delivery to clients 12. In particular embodiments, cached content store 26 stores media files 30 in a commonly-requested format to minimize the frequency with which transcoding is performed. As a result, CMS 16 may determine whether a requested media file 30 is stored in cached content store 26 before requesting the requested media file 30 from load balancing server 18 and/or transcoders 20. Moreover, in such embodiments, CMS 16 may be able to deliver media files 30 directly from cached content store 26 to clients 12 capable of receiving and displaying content in the storage content format. As a result, in such embodiments, system 10 may deliver content, when appropriate, from cached content store 26 to clients 12 without any transcoding, transrating, or other modification. For example, if a particular video file is frequently requested by clients 12 in Media Video (WMV) and Audio Video Interleave (AVI) formats, but rarely requested in Quicktime video format, system 10 may store the video file in cached content store 26 in WMV and AVI but not Quicktime formats for efficient use of storage and transcoding resources.

Original content store 22 stores media files 30 for delivery to clients 12. In particular embodiments, the media files 30 in original content store 22 may all be stored in a single storage format supported by system 10. Alternatively, original content store 22 may store media files 30 having a variety of different formats or characteristics and/or appropriate for transmission or display by a variety of different clients 12. Although shown in FIG. 1 as part of system 10, original content store 22 may represent components external to system 10, such as memory components distributed throughout the Internet. As a result, in particular embodiments, transcoders 20 may be able to retrieve and process for delivery to clients 12 media files 30 provided by a vast number of content sources available throughout the Internet.

Transcoded content store 24 stores media files 30 or portions of media files 30 after the content has been transcoded by transcoders 20. In particular embodiments, transcoded content store 24 may represent storage local or internal to transcoders 20. As discussed further below, transcoders 20 may, in particular embodiments, transcode media files 30 and store or buffer transcoded portions of these media files 30 in transcoded content store 24.

As one specific example, transcoders 20 may, as part of transcoding, create a media file 30 in transcoded content store 24 (shown in FIG. 1 as media file 30b) in which to store transcoded content from a requested media file 30 (shown in FIG. 1 as media file 30a). While the relevant transcoder 24 is storing transcoded content in the created media file 30b, the same transcoder 24 and/or another transcoder 24 may simultaneously stream or otherwise transmit transcoded content from the created media file 30b to a requesting client 12. As a result, the transcoder 24 responsible for writing transcoded content to the created media file 30b may be capable of reading transcoded content out of the created media file 30b at the same time transcoder 24 is writing to media file 30b. In particular embodiments, transcoders 24 may be capable of providing faster than realtime transcoding of media files 30 to prevent the streaming transcoder 24 from exhausting the available transcoded content.

In general, original content store 22, transcoded content store 24, and cached content store 26 may each represent or include any appropriate type of memory devices. These content stores may comprise, for example, any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Media files 30 may comprise any suitable form of voice, non-voice audio, animation, and/or video information or data that may be played, displayed or otherwise communicated by clients 12 to users of clients 12. Examples of media files include Moving Picture Experts Group (MPEG), Windows Media Video (WMV), Audio Video Interleave (AVI), and Quicktime video files; audio content such as Waveform audio (WAV), MPEG-1 Audio Layer 3 (MP3), and/or Windows Media Audio (WMA) files; image data such as Joint Photographic Experts Group (JPEG) or Tagged Image File Format (TIFF) files; and/or content of any other appropriate type or format. As discussed further below, the media files 30 available on system 10 may, in particular embodiments, have a variety of different characteristics that may determine the types of clients 12 that can utilize the various media files 30. For example, media files 30 may be associated with different codecs, bit-rates, resolutions, and/or other characteristics that may effect which clients 12 can utilize the various media files 30.

Load balancing server 18 receives transcode requests 34 from CMS 16 and selects an appropriate transcoder 20 to modify or format requested content for delivery to a particular client 12. Load balancing server 18 may additionally notify CMS 16 and/or clients 12 that the modification of requested content has begun and identify the selected transcoder to the relevant components of system 10. Load balancing server 18 may include any appropriate combination of software and/or hardware suitable to provide the described functionality.

Transcoders 20 retrieve requested content from original content store 22 and modify requested content in a manner suitable for transmission to and display by the requesting client 12. Depending on the capabilities of the requesting client 12 and the characteristics of the requested media file 30, transcoders 20 may transcode, transrate, adjust the resolution of, and/or modify the requested content file 30 and/or appropriate characteristics of the content file 30 in any appropriate manner to make the relevant media file 30 suitable for transmission to and or playback by the requesting client 12. Transcoders 20 may also be capable of transmitting modified content to the requesting client 12. In particular embodiments, transcoders 20 may be capable of transcoding content at a realtime or faster than realtime speed.

Transcoders 20 may be capable of modifying media files 30 in any appropriate manner to facilitate transmission to and/or playback by clients 12. As part of modifying media files 30, transcoders 20 may modify a requested media file 30 from a first format, such as an original format in which the relevant media file 30 is stored, to a second format, such as a target format appropriate for transmission to and display by a requesting client 12. For purposes of this description and the claims that follow, the format of a media file 30 may refer to the file's encoding, bit-rate, resolution, and/or any other aspect, characteristic, or property of the relevant media file 30 and/or its corresponding content that is associated with the file's transmission to or display by a particular client 12.

As described further below, transcoders 20 may, in particular embodiments, be capable of transmitting transcoded portions of a requested media file 30 to the requesting client 12 before completing transcoding of the entire file, thereby reducing the delay between the client's request for the media file 30 and delivery of appropriately formatted content to the requesting client 12. Transcoder 20 may include any appropriate combination of software and/or hardware suitable to provide the described functionality. The contents of a particular embodiment of transcoder 20 are described in greater detail below with respect to FIG. 2.

In operation, CMS 16 initiates the retrieval of media files 30 requested by clients 12. These media files 30 may be transcoded by transcoders 20 to provide content suitable for transmission to and/or display by the requesting client 12. By transmitting transcoded portions of a requested media file 30 to client 12 before the entirety of the requested media file 30 is transcoded, transcoders 20 may reduce the latency associated with the relevant transcoding An example of this process, as implemented by a particular embodiment of system 10, is illustrated in FIG. 1. As shown by FIG. 1, a client 12 (here, client 12a) may initiate the delivery process by transmitting a content request 32 to CMS 16. Content request 32 may identify a specific media file 30 or may describe characteristics (through, for example, keywords) of the requested media content. Content request 32 may represent any appropriate message, request, or appropriately structured collection of information requesting delivery of content by the transmitting client 12. For example, in particular embodiments, content request 32 represents a Hypertext Transfer Protocol (HTTP) request that identifies a particular media file 30 stored by original content store 22.

In response to receiving content request 32, CMS 16 may, in particular embodiments, determine an appropriate format (referred to here as the "target format") for the requested content to allow and/or optimize transmission to and playback by the requesting client 12. CMS 16 may determine the target format based on any appropriate information, considerations, or and/or circumstances. As one example, content request 32 may indicate the appropriate form that the requested content should have for transmission to and/or playback by the requesting client 12. Thus, in particular embodiments, CMS 16 may receive an HTTP request specifying the codec, bit-rate, and/or other parameters for the requested media file 30. As a result, CMS 16 may be able to determine, based on information contained in the HTTP request, the output format and characteristics appropriate for the requested media file 30.

As another example, CMS 16 may identify the requesting client 12 and/or relevant characteristics of the requesting client 12 and determine a target format for the requested content based on this information. For example, CMS 16 may identify whether the client is a computer 12a, cellular phone 12b, or personal data assistant 12c. In response, CMS 16 may determine the format characteristics appropriate for the particular client 12a-c based on the type of client 12.

As yet another example, CMS 16 may detect characteristics of the particular network or portion of network 14 that the requesting client 12 is communicating over to determine an appropriate target format in which to provide the requested content to the requesting client 12. Thus, in particular embodiments, CMS 16 may determine, based on the fact that content request 32 was received over a certain type of network, an appropriate codec or bit-rate at which to transmit the requested content to the requesting client 12. In general, however, CMS 16 may determine, in any suitable manner and based on input from any appropriate components, the proper format and characteristics for the content requested by the requesting client 12.

In particular embodiments, system 10 may include cached content store 26 in which media files 30 may be stored in certain formats (e.g., after being transcoded by transcoders 20 in response to a previous content request 32). As a result, in such embodiments, CMS 16 may determine whether the requested media file 30 is already stored in cached content store 26 in the target format. If cached content store 26 contains the requested media file 30 in the target format, CMS 16 may then retrieve the requested media file 30 in the target format and transmit the requested media file 30 to the requesting client 12.

If, however, cached content store 26 does not contain the requested media file 30 in the target format (or if system 10 does not include any cached content store 26), CMS 16 may initiate transcoding of a copy of the requested media file 30. To initiate transcoding of the requested media file 30, CMS 16 may transmit a transcode request 34 to a transcoder 20 or, in embodiments that include load balancing server 18, to load balancing server 18. Transcode request 34 may represent any appropriate message, request, or appropriately structured collection of information requesting transcoding of a particular media file 30. For example, in particular embodiments, transcode request 34 represents an HTTP request that identifies a particular media file 30 to be transcoded and an appropriate output format for the requested media file 30.

In embodiments of system 10 that include load balancing server 18, load balancing server 18 receives transcode request 34 and, in response, selects a transcoder 20 to modify the requested file according to the target format. In various embodiments, load balancing server 18 may select a transcoder 20 based on process loads, queues, and other availability indicators associated with one or more transcoders 20. Load balancing server 18 then forwards transcode request 34 to the selected transcoder 20 requesting modification of requested media file 30 according to the target format.

A particular transcoder 20 then receives transcode request 34 from CMS 16 or load balancing server 18. In response to receiving transcode request 34, the relevant transcoder 20 locates and retrieves the requested media file 30 from original content store, represented in FIG. 1 at 30a. Transcoder 20 may retrieve, receive, or access the media file 30 in any appropriate manner. In particular embodiments, original content store 22 includes one or more web servers (and the associated memory elements) accessible through the Internet and the relevant transcoder 20 may communicate with original content store 22 using the HTTP protocol.

Transcoder 20 then modifies the requested media file 30 according to the target format. As noted above, transcoder 20 may modify the requested media file 30 by transcoding, transrating, changing the resolution of, and/or otherwise changing any aspect, characteristic, or property of the content in the requested media file 30. While modifying media file 30, transcoder 20 stores modified portions of media file 30 (labeled 30b in FIG. 1) in transcoded content store 24. As noted above and described further in reference to FIG. 2 below, transcoded content store 24 may, in particular embodiments, represent memory elements local to and/or incorporated within transcoder 20, such as internal memory. In alternative embodiments, transcoded content store 24 may represent remote or networked memory elements external to transcoder 20, such as SAN or NAS storage components.

Additionally, before or while modifying the content in the requested media file 30, transcoder 20 sends a transcode response 36 to load balancing server 18 and/or CMS 16 indicating a first portion of media file 30 has been (or will be) modified according to the target format and is available (or will soon be available) for delivery to client 12. In particular embodiments, transcoder 20 may send transcode response 36 to load balancing server 18 and/or CMS 16 via network 14 indicating that a portion of the requested media file 30 has been transcoded to the target format.

In addition, in particular embodiments, transcode response 36 may include a transcode identifier 38 that represents an address, location, or other identifier for the relevant transcoder 20 that the requesting client 12 may use to retrieve the modified content. For example, in particular embodiments, transcoder identifier may represent a Real Time Streaming Protocol (RTSP) uniform resource locater (URL) address. Transcode identifier 38 may be sent from transcoder 20 to CMS 16 directly over network 14, or by first passing through load balancing server 18. CMS 16 may then communicate transcode identifier 38 to the requesting client 12, e.g., as an HTTP response.

As an alternative to or in addition to transcoder 24 transmitting the requested media file 30 to a particular client 12, particular embodiments of system 10 may include streaming elements (e.g., as part of CMS 16) other than transcoders 20 that may access transcoded content store 24 to retrieve a particular media file 30 once the relevant transocoder 20 has begun storing modified content in that media file 30. These streaming elements may then be responsible for transmitting modified content to clients 12 while the relevant transcoder 20 continues to store modified content in the accessed media file 30. As a result, system 10 may, in particular embodiments, be integrated with proprietary and/or legacy systems with little reconfiguration of existing streaming infrastructure.

Client 12 may then communicate with transcoder 20 over network 14 using the received transcode identifier 38 to initiate retrieval of the modified content, represented in FIG. 1 as 30c. For example, the requesting client 12 may then transmit a transmit request 40 requesting transmission of the transcoded media file 30 to client 12. The modified content may be retrieved by client 12 as a media stream, progressive download, or in any other appropriate manner, while the relevant transcoder 20 continues modifying the content of the requested media file 30. Thus the content flow through transcoder 20 represented in FIG. 1 by 30a, 30b, and 30c may occur simultaneously.

Additionally, in particular embodiments, transcoders 20 may be configured to transmit modified content to clients 12 indirectly with the modified content being first transmitted to an intermediate component that forward the content to the requesting client 12 (e.g., as a stream). For example, system 10 may include a streamer (such as a Darwin, Windows Media, or Flash streamer) that receives modified content from a transcoder 12 and streams the modified content to the requesting client 12. Such a configuration may, in particular embodiments, allow streamers that are unable to stream content from an incomplete media file 20 to offer low latency by mirroring modified content streamed by transcoder 20. This may further allow system 10 to be integrated with proprietary and/or legacy systems with little reconfiguration of existing infrastructure.

Additionally, in particular embodiments, system 10 may be configured so that if a second client 12 sends a second content request 32 to CMS 16 requesting the same media file 30 in the same target format as the original content request 32 while the relevant transcoder 20 is still modifying the requested content, rather than repeating the process described above, CMS 16 may send a transcode request 34 to load balancing server 18 identifying the requested media file 30 and target format. Load balancing server 18 may then send CMS 16 a transcode identifier 38 associated with the transcoder 20 that is currently modifying the requested content or any other transcoder 20. CMS 16 then directs the second client 12 to the transcoder 20 performing the modification. Once the second client is in communication with the transcoder 20, the second client may retrieve modified content at the same time as the original client 12.

When transcoder 20 completes modification of the requested content, transcoder 20 may indicate to load balancing server 18 and/or CMS 16 that modification is complete. In particular embodiments, transcoder 20 may send a message to the CMS 16 in response to which CMS 16 may direct transcoder 20 to continue storing the modified content in transcoded content store 24, send the modified content to cached content store 26, and/or delete modified content from the transcoded content store 24. For example, in particular embodiments, transcoder 20 may transmit a message to CMS 16 specifying a URL address from which CMS 16 may retrieve the modified media file 30. Alternatively, in particular embodiments, transcoder 20 may automatically store the modified content file 30 in cached content store 26 after modifying the media file 30.

Thus, by allowing clients 12 to retrieve modified content from requested content files 30 before transcoders 20 have completed the relevant modifications, system 10 may provide low-latency content delivery. Additionally, as a result of the ability of transcoder 20 to provide simultaneous, real-time modification and delivery of modified content to multiple users, CMS 16 and cached content store 26 can store content in one or a select few frequently requested output formats, but deliver requested content in a variety of formats with little to no increase in delivery times and quality. This may result in reduced storage requirements for cached content store 26 and may allow CMS 16 and cached content store 26 to service a greater number and variety of users and eliminate the time and expense of pre-transcoding all content to be stored on cached content store 26. As a result, the use of system 10 may provide a number of benefits, including advantageous scaling properties, efficient use of storage, low latency delivery times to clients, and efficient use of transcoding resources. Additionally, particular embodiments of system 10 may make a large number of different media files in a wide variety of formats and located at various locations on the Internet available to a particular client that supports only a limited range of media formats. Consequently, particular embodiments of system 10 may provide numerous operational benefits. Specific embodiments, however, may provide none, some, or all of these benefits.

Figure 2:
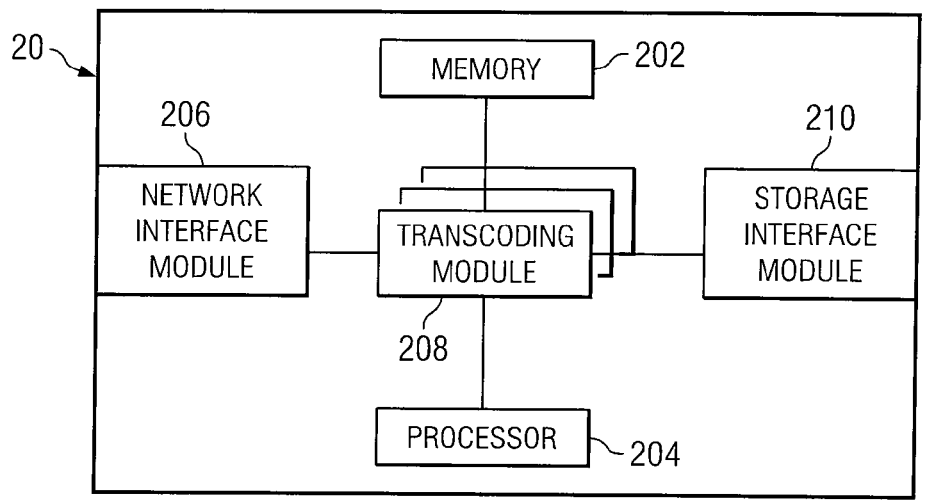
FIG. 2 is a functional diagram of a transcoder that may be utilized in particular embodiments of the system shown in FIG. 1.

FIG. 2 is a block diagram illustrating in greater detail the contents and operation of a particular embodiment of the transcoder 20 shown in FIG. 1. In general, as discussed above with respect to FIG. 1, transcoder 20 retrieves content for delivery to clients 12 and modifies the retrieved content in an appropriate manner to facilitate transmission to and display by the requesting client 12. As shown in FIG. 2, transcoder 20 may include a processor 202, memory 204, a network interface module 206, a transcoding module 208, and a storage interface module 210.

Processor 202 may represent or include any form of processing component, including general purpose computers, dedicated microprocessors, or other processing devices capable of processing electronic information. Examples of processor 202 include digital signal processors (DSPs), application-specific integrated circuits (ASICs), field-programmable gate arrays (FPGAs), and any other suitable specific or general purpose processors. Although FIG. 2 illustrates a particular embodiment of transcoder 20 that includes a single processor 202, transcoder 20 may, in general, include any suitable number of processors 204.

Memory 204 stores processor instructions, codecs, and/or values and parameters utilized by transcoder 20 during operation. Memory 204 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 204 may represent, in part, computer-readable media on which computer instructions are encoded. In such embodiments, some or all the described functionality of transcoder 20 may be provided by processor 202 executing the instructions encoded on the described media. Although shown in FIG. 2 as a single component, memory 204 may represent any number of memory elements within, local to, or accessible by transcoder 20.

Network interface module 206 couples transcoder 20 to appropriate components of system 10 to facilitate communication between transcoder 20 and load balancing server 18, clients 12, and/or other appropriate components of system 10 regarding content-delivery operations performed by transcoder 20. For example, transcoder 20 may receive transcode requests 34 from load balancing server 18 and transmit transcode responses 36 to load balancing server 18 through network interface module 206. In particular embodiments, network interface module 206 includes or represents one or more network interface cards (NICs) suitable for packet-based communication over network 14.

Transcoding module(s) 208 modify content received by transcoder 20. In particular embodiments, transcoder 20 may include multiple transcoding modules 208 capable of translating, transcoding, transrating, and/or otherwise modifying various different types of received content based on a target format for a received request. In certain of the embodiments that include multiple transcoding modules 208, transcoding modules 208 may be capable of operating concurrently so that multiple sets of content can be modified simultaneously. As a result, transcoder 20 may provide a robust platform for use in high-traffic systems.

Storage interface module 210 facilitates communication of content between transcoder 20 and various components of system 10. Specifically, transcoder 20 receives content from original content store 22 and communicates content to and from transcoded content store 24 through storage interface module 210. To support multiple simultaneous transcoding processes, storage interface module 210 may include multiple ports through which storage interface module 210 can receive/transmit multiple flows simultaneously from/to transcoded content store 24 and/or original content store 22.

In particular embodiments, original content store 22 and transcoded content store 24 are both remote from transcoder 20. As a result, in such embodiments, storage interface module 210 may represent, in part or in whole, elements of network interface module 206. In alternative embodiments, one or both of original content store 22 or transcoder content store 24 may represent memory components internal to transcoder 20, such as memory 204. In such embodiments, storage interface module 210 may represent, in whole or in part, a memory bus and/or other suitable components configured to communicate information between internal memory components and other components of transcoder 20.

In general, each of network interface module 206, transcoding module 208, and storage interface module 210 may represent any appropriate combination of hardware and/or software suitable to provide the described functionality. Additionally, any two or more of network interface module 206, transcoding module 208, and storage interface module 210 may represent or include common elements. In particular embodiments, network interface module 206, transcoding module 208, and storage interface module 210 represent, in part, software applications being executed by processor 202.

As one specific example, particular embodiments of transcoder 20 may contain a plurality of transcoding modules 208 with each transcoding module 208 representing or including a digital signal processor (DSP). Each DSP may have a portion of memory 204 local to that DSP in which appropriate information for encoding/decoding multiple different codecs is stored. As a result, transcoder 20 may provide a power-efficient, compact platform for realtime transcoding in a high-traffic system.

Figure 3B:
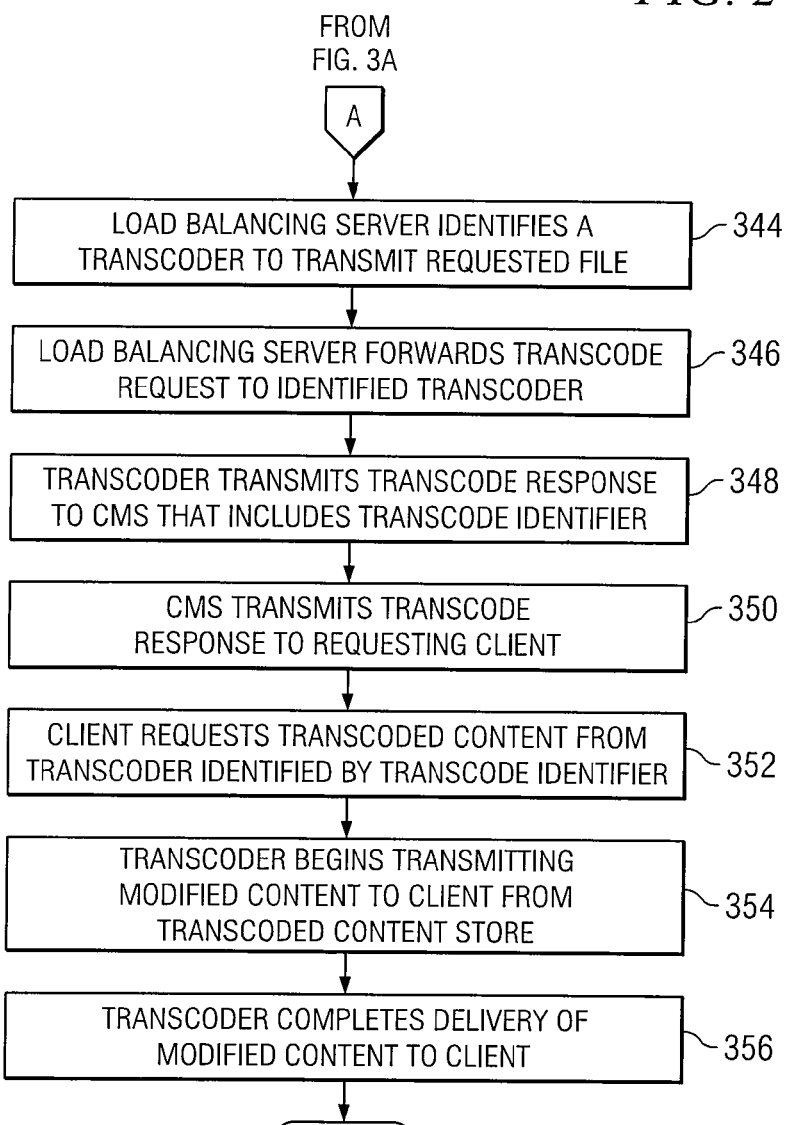
FIGS. 3A and 3B is a flowchart detailing an example operation of a content management server, load balancing server, and transcoder in accordance with one embodiment of the present invention.
Figure 3A:
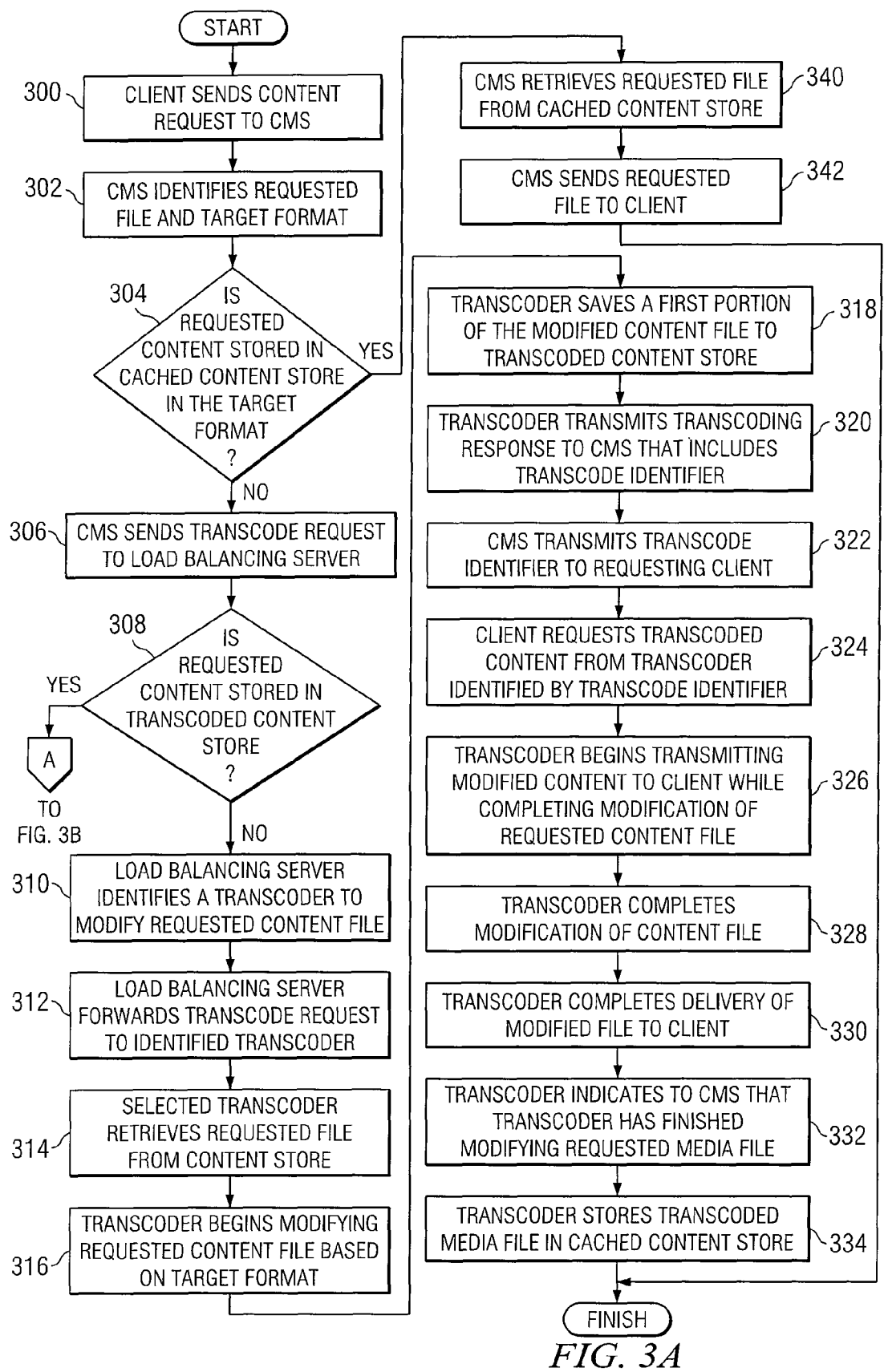

FIGS. 3A and 3B are a flowchart illustrating operation of a particular embodiment of system 10 in delivering content to a requesting client 12. The steps illustrated in FIGS. 3A and 3B may be combined, modified, or deleted where appropriate, and additional steps may also be added to the flowchart. Additionally, the steps may be performed in any suitable order without departing from the scope of the invention.

Operation, in the illustrated example, begins at step 300 with a client 12 sending a content request 32 for a media file 30 to CMS 16. CMS 16 may provide a web page configured to display a library of media files 30 viewable and/or otherwise accessible to client 12. In particular embodiments, client 12 requests media file 30 from CMS 16 by transmitting an HTTP request to CMS 16 that identifies the requested media file 30. The HTTP request may also specify information about client 12 and/or a requested display format so that the content can be modified in a manner appropriate for transmission to and display by client 12.

At step 302, CMS 16 determines an appropriate target format for the requested media content based on the particular requirements of client 12. The target format may be the format required to download, view, display, or receive a particular media on a computer 12a, cell phone 12b, or personal data assistant 12c. At step 304, CMS 16 then determines whether cached content store 26 contains the requested media file 30 in the target format. If the requested media file 30 is already available from cached content store 26 in the target format, operation proceeds to step 340 where CMS 16 may access or retrieve the requested media file 30. CMS 16 may then transmit the requested media file 30 to client 12 at step 342.

If, however, the requested media file 30 is not available from cached content store 26 in the target format, at step 306, CMS 16 may send a transcode request 34 to load balancing server 18 identifying the requested media file 30 and the target format. At step 308, load balancing server 18 may then determine at step 308 whether the requested media file 30 is available in transcoded content store 24 in the target format, for example, as the result of a currently ongoing or recently completed transcoding operation performed by one of transcoders 20. If load balancing server 18 determines that the requested media file 30 is available in transcoded content store 24, load balancing server 18 may attempt to satisfy the received transcoding request 34 with the copy of the requested media file 30 that has already been transcoded. If so, operation continues at step 344 on FIG. 3B.

Otherwise, load balancing server 18 may then select a transcoder 20 to modify requested media file 30 according to the target format at step 310. Load balancing server 18 may select a particular transcoder 20 to perform the modification based on availability, capacity, functionality, and/or any other appropriate factors or considerations.

At step 312, load balancing server 18 may then forward transcode request 34 to the selected transcoder 20 requesting that transcoder 20 modify requested media file 30 according to the target format. At step 314, transcoder 20 may then receive transcode request 34 and proceed by retrieving the requested media file 30 from original content store 22. Transcoder 20 may then begin modifying the requested media file 30 based on the target format at step 316. For example, transcoder 20 may transcode, transrate, change the resolution of, and/or otherwise modify the requested media file 30 based on the target format. While transcoder 20 modifies the requested media file 30, modified portions may be stored in transcoded content store 24 at step 318.

Before or after initiating this modification process, transcoder 20 may send a transcode response 36 to CMS 16, at step 320, directly or by sending transcode response 36 to load balancing server 18 which in turn forwards transcode response 36 to CMS 16. Transcode response 36 indicates that a transcoder 20 has begun transcoding the requested media file 30 based on the target format and a portion of the modified content is available. In particular embodiments, transcode response 36 may include transcode identifier 38 that specifies a location or address associated with a transcoder 20 and/or otherwise identifies a transcoder 20 from which client 12 can retrieve the requested media file 30 in the appropriate format.

CMS 16 may then transmit transcode identifier 38 to client 12 by forwarding transcode response 36 to client 12 or by otherwise communicating transcode identifier 38 to client at step 322. At step 324, client 12 may then request, from the transcoder 20 identified by transcode identifier 38, modified content from the requested media file 30. In response, the relevant transcoder 20 may begin transmitting modified content from the requested media file 30 to the requesting client 12, at step 326, and the requesting client 12 may begin playback of the modified content.

At step 328, the relevant transcoder 20 may complete transcoding of the requested media file 30. At some point after completing transcoding of the requested media file 30, the relevant transcoder 20 also completes delivery of modified content to the requesting client 12 at step 330. Additionally, once the modification of requested media file 30 is completed, transcoder 20 may indicate to CMS 16 (directly or through load balancing server 18) that modification of the requested media file 30 is complete at step 332. The relevant transcoder 20 may then store the modified media file 30 in cached content store 26 at step 334. CMS 18 may then fulfill subsequent requests for that media file 30 in the same target format by accessing cached content store 26. Operation of system 10 with respect to delivering the requested media file 30 may then end as shown in FIG. 3A.

If, instead, load balancing server 18 determines at step 308 that the requested media file 30 is available in the target format in transcoded content store 24, load balancing server 18 may attempt to transmit the modified content from transcoded content store 24 to the requesting client 12. As shown in FIG. 3B, this may include load balancing server 18 identifying a transcoder 20 at step 344 to retrieve the modified content from transcoded content store 24 and transmit the modified content to the requesting client 12. Load balancing server 18 may then forward transcode request 34 to the identified transcoder 20 at step 346.

At step 348, the identified transcoder 20 may send a transcode response 36 to CMS 16, directly or by sending transcode response 36 to load balancing server 18 which in turn forwards transcode response 36 to CMS 16. In this context, transcode response 36 indicates that the requested media file 30 is available in the target format and the relevant transcoder can transmit the requested media file 30 to the requesting client 12. In particular embodiments, this transcode response 36 may also include transcode identifier 38 that specifies a location or address associated with the relevant transcoder 20 and/or otherwise identifies that transcoder 20.

CMS 16 may then transmit transcode identifier 38 to client 12 by forwarding transcode response 36 to client 12 or by otherwise communicating transcode identifier 38 to client at step 350. At step 352, client 12 may then request, from the transcoder 20 identified by transcode identifier 38, modified content from the requested media file 30. In response, the relevant transcoder 20 may begin transmitting modified content from the modified version of the media file 30 stored in transcoded content store 24 to the requesting client 12, at step 354, and the requesting client 12 may begin playback of the modified content. The relevant transcoder 20 subsequently completes delivery of modified content to the requesting client 12 at step 356. Operation of system 10 with respect to delivering the requested media file 30 may then end as shown in FIG. 3B.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of managing media files having different format characteristics, comprising:
   receiving a request identifying a media file;
   in response to receiving the request, retrieving the media file in a first format;
   modifying the media file from the first format to a second format associated with a remote client; and
   while modifying the media file from the first format to the second format, transmitting a response to the remote client indicating that at least a portion of the media file is available in the second format, wherein the response includes a transcode identifier;
   receiving, at a transcoding element associated with the transcode identifier, a request from the remote client to begin transmitting the modified content to the remote client; and
   in response to the request to begin transmitting, transmitting the modified portion of the media file to the remote client while modifying a remainder of the media file from the first format to the second format.

2. The method of claim 1, wherein:
   the media file comprises a first media file;
   modifying the media file from the first format to the second format comprises:
      modifying a portion of the first media file from the first format to the second format; and
      storing the modified portion in a second media file, and
   transmitting the modified portion to the remote client comprises:
      reading the modified portion from the second media file while modified content from the first media file is being stored in the second media file;
      transmitting the modified portion to the remote client.

3. The method of claim 1, wherein:
   receiving the request comprises:
      receiving the request; and
      in response to receiving the request, selecting one of a plurality of transcoding elements to modify the media file identified by the request; and
   modifying the media file from the first format to the second format comprises modifying the media file from the first format to the second format at the selected transcoding element.

4. The method of claim 1, wherein:
   receiving the request comprises receiving a first request transmitted by a first client; and further comprising:
   receiving a second request associated with a second client.

5. The method of claim 1, wherein retrieving the media file comprises:
   determining whether the media file is stored in a first content store in a target format; and
   in response to determining that the media file is not stored in the first content store in the target format, retrieving the media file in the first format from a second content store.

6. The method of claim 5, further comprising, after modifying the media file from the first format to the second format, storing the media file in the first content store in the second format.

7. The method of claim 1, wherein:
   the request specifies a target format; and
   modifying the media file from the first format to the second format comprises modifying the media file from the first format to the target format.

8. The method of claim 1, wherein retrieving the media file comprises: transmitting a Hypertext Transfer Protocol (HTTP) request identifying the media file to a remote content store; and
   receiving the media file from the remote content store in the first format.

9. The method of claim 1, wherein:
   the transcode identifier comprises a uniform resource locator (URL) address associated with the transcoding element; and
   receiving the request from the remote client to begin transmitting the modified content comprises receiving the request at the URL address.

10. The method of claim 1, wherein the remote client comprises a first remote client, and further comprising:
   while transmitting modified portions of the media file to the first remote client, receiving a request from a second remote client associated with the second format to begin transmitting the modified content to the second remote client; and
   while transmitting modified portions of the media file to the first remote client, initiating transmission of modified portions of the media file to the second remote client.

11. The method of claim 1, wherein transmitting the modified portion of the media file to the remote client comprises streaming the media file to the remote client.

12. The method of claim 1, wherein transmitting the modified portion of the media file to the remote client comprises initiating a progressive download of the media file to the remote client.

13. The method of claim 1, wherein the remote client comprises a wireless remote client.

14. A system for managing media files having different format characteristics to one or more of a plurality of clients each associated with one or more media file formats, comprising:
  one or more transcoders, each transcoder operable to:
    receive a request identifying a media file;
    in response to receiving the request, retrieving the media file from a first content store in a first format;
    modifying the media file from the first format to a second format associated with the first client; and
    while modifying the media file from the first format to the second format, transmitting a response to the first client indicating that at least a portion of the media file is available in the second format, wherein the response includes a transcode identifier;
    receiving, at a transcoding element associated with the transcode identifier, a request from the remote client to begin transmitting the modified content to the remote client; and
    in response to the request to begin transmitting, transmitting the modified portion of the media file to the remote client while modifying a remainder of the media file from the first format to the second format.

15. The system of claim 14, further comprising:
  a content management server operable to:
    receive the request from a first client;
    in response to receiving the request, determine whether the identified media file is stored in a second content store in the second format; and
    in response to determining that the identified media file is stored in the second content store in the second format, transmit the media file from the second content source to the first client; and
    in response to determining that the identified media file is not stored in the second content store in the second format, transmitting the request to the transcoder.

16. The system of claim 14, wherein the transcoders are further operable to, after modifying the media file from the first format to the second format, store the media file in the second content store in the second format.

17. The system of claim 14, wherein:
  the request specifies a target format; and
  the transcoders are operable to modify the media file by modifying the media file from the first format to the target format.

18. The system of claim 14, wherein the transcoders are operable to retrieve the media file by transmitting a Hypertext Transfer Protocol (HTTP) request identifying the media file to the first content store.

19. The system of claim 14, wherein the at least one transcoder is further operable to:
  while transmitting modified portions of the media file to the first remote client, receive a request from a second client associated with the second format to begin transmitting the modified content to the second client; and
  while transmitting modified portions of the media file to the first client, initiating transmission of modified portions of the media file to the second client.

20. The system of claim 14, wherein the at least one transcoder is operable to send the modified portion of the media file to the first client by streaming the media file to the first client.

21. The system of claim 14, wherein the at least one transcoder is operable to send the modified portion of the media file to the first client by initiating a progressive download of the media file to the first client.

22. A system for managing media files having different format characteristics, comprising:
  means for receiving, from a first client, a request identifying a media file;
  means for retrieving the media file from the content store in a first format in response to receiving the request;
  means for modifying the media file from the first format to a second format associated with the first client; and
  means for transmitting a response to the first client, while modifying the media file from the first format to the second format, wherein the response indicates that at least a portion of the media file is available in the second format and includes a transcode identifier;
  means for receiving, at a transcoding element associated with the transcode identifier, a request from the remote client to begin transmitting the modified content to the remote client; and
  means for transmitting the modified portion of the media file to the remote client while modifying a remainder of the media file from the first format to the second format in response to the request to begin transmitting.

23. A system for providing realtime modification of digital video content for on-demand transmission to and display by wireless clients, comprising:
  a plurality of wireless clients each associated with at least one of a plurality of different file formats;
  a content management server operable to:
    receive a content request from a first client identifying a media file;
    in response to receiving the content request, determine whether the identified media file is stored in a first content store in a target format;
    in response to determining that the identified media file is stored in the first content store in the target format, transmit the media file from the first content source to the first client; and
    in response to determining that the identified media file is not stored in the second content store in the second format:
      transmit a transcode request identifying the identified media file;
      receive a transcode response from a transcoder responsible for modifying the identified media file; and
      forward the transcode response to the first client;
  a load balancing server, operable to:
    receive the transcode request from the content management server,
    in response to receiving the transcode request, select a transcoder to modify the identified media file; and
    instruct the selected transcoder to modify the identified media file to the target format; and
  a plurality of transcoders, each transcoder operable to:
    retrieve the identified media file from a second content store in an original format;
    modify a portion of the identified media file from the original format to the target format;
    store the modified portion in a second media file;

transmit the transcode response to the first client while modifying the first media file from the original format to the target format, wherein the transcode response indicates that at least a portion of the media file is available in the second format and includes a transcode identifier;

receive, from the first client, a transmission request requesting transmission of the modified content;

in response to the transmission request, read the modified portion from the second media file while modified content from the first media file is being stored in the second media file; and transmit the modified portion to the first client.

* * * * *